(12) United States Patent
Beland et al.

(10) Patent No.: US 9,940,854 B2
(45) Date of Patent: Apr. 10, 2018

(54) METHODS OF MONITORING ELECTRONIC DISPLAYS WITHIN A DISPLAY NETWORK

(75) Inventors: Graham N. Beland, Wellsville, UT (US); Eli Taylor, Smithfield, UT (US)

(73) Assignee: PRISMVIEW, LLC, Logan, UT (US)

( * ) Notice: Subject to any disclaimer, the term of this patent is extended or adjusted under 35 U.S.C. 154(b) by 1064 days.

(21) Appl. No.: 13/398,660

(22) Filed: Feb. 16, 2012

(65) Prior Publication Data
US 2012/0150476 A1    Jun. 14, 2012

Related U.S. Application Data

(63) Continuation of application No. 12/553,500, filed on Sep. 3, 2009, now Pat. No. 8,126,678, which is a continuation of application No. 11/840,091, filed on Aug. 16, 2007, now Pat. No. 7,596,471.

(51) Int. Cl.
*G09F 9/30*     (2006.01)
*G06Q 30/02*    (2012.01)

(52) U.S. Cl.
CPC ........... *G09F 9/30* (2013.01); *G06Q 30/0241* (2013.01)

(58) Field of Classification Search
CPC ............................. G09F 9/30; G06Q 30/0272
See application file for complete search history.

(56) References Cited

U.S. PATENT DOCUMENTS

| | | | |
|---|---|---|---|
| 6,154,771 A * | 11/2000 | Rangan | H04N 5/76 345/660 |
| 6,349,330 B1 | 2/2002 | Bernadett et al. | |
| 6,424,998 B2 | 7/2002 | Hunter | |
| 6,430,603 B2 | 8/2002 | Hunter | |
| 6,430,605 B2 | 8/2002 | Hunter | |
| 6,741,271 B1 | 5/2004 | McConica et al. | |
| 7,038,637 B1 | 5/2006 | Eller et al. | |
| 7,088,335 B2 | 8/2006 | Hunter et al. | |
| 7,502,950 B1 * | 3/2009 | Brands | G06F 3/1446 323/234 |
| 7,596,471 B1 | 9/2009 | Beland et al. | |
| 2001/0013015 A1 * | 8/2001 | Hunter | G06Q 30/02 705/27.1 |
| 2002/0003575 A1 * | 1/2002 | Marchese | G06F 17/3025 348/231.99 |
| 2003/0004806 A1 * | 1/2003 | Vaitekunas | G06F 3/14 705/14.63 |
| 2003/0068087 A1 | 4/2003 | Wu et al. | |
| 2003/0115096 A1 * | 6/2003 | Reynolds | G06Q 30/02 705/14.58 |
| 2003/0146891 A1 * | 8/2003 | Poliakine | G06F 3/1446 345/87 |
| 2004/0095396 A1 | 5/2004 | Stavely et al. | |
| 2004/0128691 A1 | 7/2004 | Egawa et al. | |

(Continued)

*Primary Examiner* — Hyun Park
*Assistant Examiner* — Liam R Casey
(74) *Attorney, Agent, or Firm* — Sughrue Mion, PLLC (57) ABSTRACT

Methods of monitoring one or more electronic displays are disclosed. A method may include performing at least one diagnostic operation on at least one electronic display having at least one camera, a display element, and a display server. Further, the method may include transmitting data relating to the at least one diagnostic operation to a network remote from the at least one electronic display. Additionally, the method may include displaying the data within the remote network.

25 Claims, 4 Drawing Sheets

(56) References Cited

U.S. PATENT DOCUMENTS

| | | |
|---|---|---|
| 2004/0205504 A1* | 10/2004 | Phillips ................. G06F 17/211 |
| | | 715/209 |
| 2005/0069107 A1 | 3/2005 | Tanaka et al. |
| 2006/0064716 A1* | 3/2006 | Sull ................... G06F 17/30793 |
| | | 725/37 |
| 2006/0143153 A1* | 6/2006 | Mifune ............. G06F 17/30011 |
| 2006/0227085 A1* | 10/2006 | Boldt, Jr. ................. G09G 3/32 |
| | | 345/83 |
| 2007/0076431 A1* | 4/2007 | Atarashi ............. G02B 6/0085 |
| | | 362/613 |
| 2007/0204032 A1* | 8/2007 | Strand .................... H04L 67/26 |
| | | 709/224 |
| 2008/0109856 A1 | 5/2008 | Beland |
| 2008/0192840 A1 | 8/2008 | Hua et al. |
| 2008/0201208 A1 | 8/2008 | Tie et al. |

* cited by examiner

METHODS OF MONITORING ELECTRONIC
DISPLAYS WITHIN A DISPLAY NETWORK

CROSS-REFERENCE TO RELATED
APPLICATIONS

This application is a continuation of U.S. patent application Ser. No. 12/553,500, filed Sep. 3, 2009, pending, which is scheduled to issue on Feb. 28, 2011 as U.S. Pat. No. 8,126,678, and which application is a continuation of application Ser. No. 11/840,091, filed Aug. 16, 2007, now U.S. Pat. No. 7,596,471, issued Sep. 29, 2009. The disclosure of each of the aforementioned patent applications is incorporated by reference herein in its entirety.

BACKGROUND OF THE INVENTION

Field of the Invention

The present invention relates generally to electronic displays and, more specifically, to monitoring operation of one or more electronic displays within a display network.

State of the Art

Displays or signs, such as billboards, have been used for many years to convey information to passersby such as advertising, traffic messages, and the like. Traditionally, these displays were only capable of delivering a single message or advertisement. This message was generally printed on strips of paper that were then adhered to the display. To change the message, new paper needed to be printed and adhered to the display.

More recently, displays have become electronic, using lights, light emitting diodes (LEDs), and other electronic devices to display visual content that can be easily adaptable to display a wide variety of messages in the form of words and images from the same display without having to physically change the characteristics of the display. These electronic displays can easily modify a graphic image or message to create video displays and modify the type of message or advertisement that is shown on the electronic display at regular intervals, or at targeted times depending on expected traffic near the display, or public interest. These possible images are generally referred to herein as visual content.

For conventional displays, the visual content is delivered to the physical location and affixed to the display. With electronic displays, the visual content must still be delivered to the physical location, but the content delivery may be performed electronically. In addition, while traditional displays may display the same message for weeks or months at a time, electronic displays enable the message to be changed easily and often. Thus, it may be possible to modify the visual content many times in a single day. Furthermore, electronic displays may be networked together such that the displays may communicate with each other, or with a central computer.

Although electronic displays have increased the productivity and the efficiency by which information is conveyed to passersby, monitoring and maintaining the operation of electronic displays within a display network remains challenging. For example, an error displayed on an electronic display or a malfunction of an electronic display typically goes unresolved until a customer notifies maintenance personnel.

There is a need for methods to improve the functionality of electronic displays. Specifically, there is a need to enhance the method of monitoring one or more electronic displays.

BRIEF SUMMARY OF THE INVENTION

One embodiment of the present invention comprises a method of monitoring at least one electronic display within a display network. The method comprises performing at least one diagnostic operation on at least one electronic display including at least one camera, a display element, and a display server. The method further includes transmitting data relating to the at least one diagnostic operation to a network remote from the at least one electronic display. Additionally, the method includes displaying the data within the network.

Another embodiment of the present invention comprises a method of monitoring a display network. The method comprises performing at least one diagnostic operation on at least one electronic display having at least one camera, a display element, and a display server operably coupled to a remote network. In addition, the method comprises transmitting graphical information to the remote network and displaying the graphical information in a thumbnail explosion on a display device within the remote network.

Yet another embodiment of the present invention comprises a computer-readable media storage storing instructions that when executed by a processor cause the processor to perform instructions for monitoring at least one electronic display within a display network according to an embodiment of the present invention.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE
INVENTION

Embodiments of the present invention provide methods for monitoring the operation of electronic displays that are configured as part of a network of electronic displays and enables a system operator to view images and/or videos of the visual content displayed by each electronic display. Furthermore, a system operator may view results of diagnostic operations performed on each electronic display.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Furthermore, in this description of embodiments of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Figure 1:
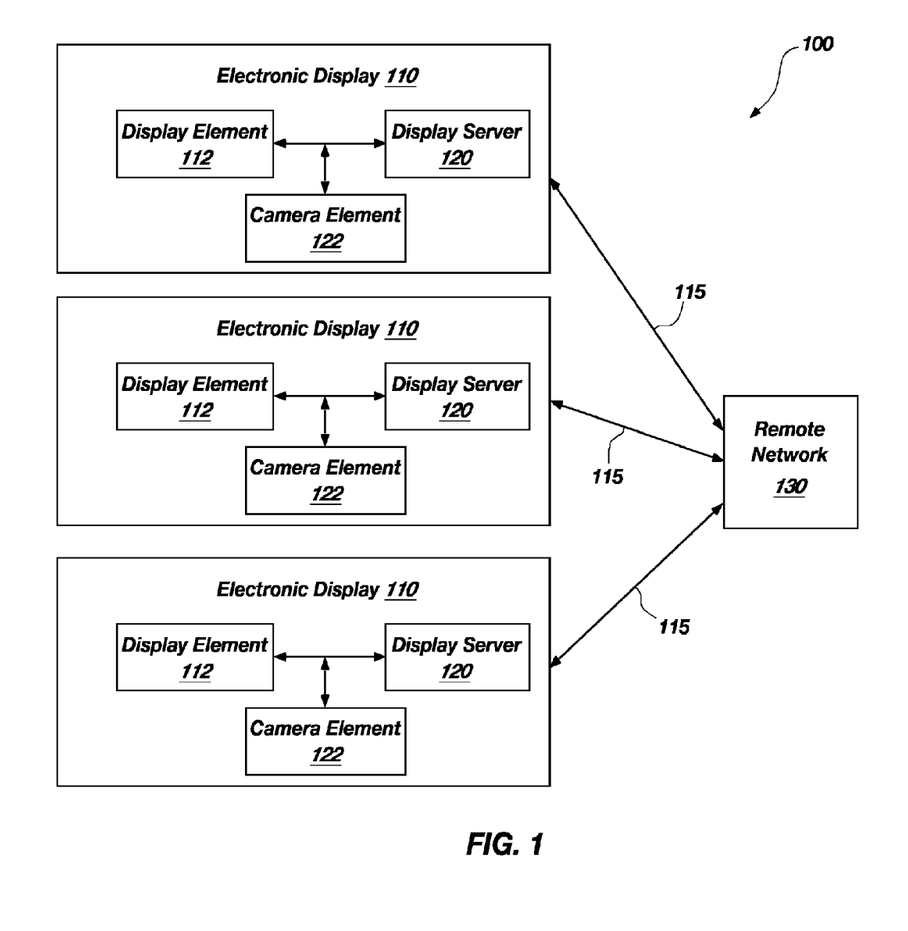
FIG. 1 is a block diagram of a display network in accordance with a representative embodiment of the invention.

FIG. 1 illustrates a display network 100 in accordance with a representative embodiment of the invention. Display network 100 may include at least one electronic display 110 and a remote network 130. In display network 100, electronic displays 110 may be located at different geographical locations. For example, electronic displays 110 may be roadside billboards that are located at different locations within a city, or they may be located at different geographical locations across a country, or around the world.

Each electronic display 110 may include a display element 112, a display server 120, and a camera element 122. Each electronic display 110 is configured to present visual content in the forms of text, still images, animations, and video images, and may also be configured to present audio content. Furthermore, the visual content may include combinations of visual content in the form of text, still images, animations and video images in the form of adjacent portions of the display carrying different types of media content as well as overlays of different types of content on top of other types of content. In addition, the media content may include both visual content and audio content. In some embodiments including both video and audio, the audio content may be synchronized to video images or various aspects of still images and animations as are known by those of ordinary skill in the art.

Electronic displays may take on a number of forms and formats. By way of example, and not limitation, electronic displays may be in the form of billboards, displays on busses, displays on bus shelters, mall directory signs, airport signs, signs in sporting and other event arenas, signs on taxis, and any other place where displays are used by multiple advertisers.

The visual content may be formatted in any suitable format for presenting and transmitting video, still images, and text. By way of example, and not limitation, some of the formats may include ASCII text, graphic interchange formats (GIF), bitmap (BMP) formats, Joint Photographic Experts Group (JPEG) formats, Moving Picture Experts Group (MPEG) formats, and the like. Similarly, the audio content may be formatted in any suitable format for presenting and transporting audio. By way of example, and not limitation, some of the formats may include MPEG-1 Audio Layer III (MP3), Waveform Audio File (WAV), WINDOWS MEDIA® audio (WMA), Advanced Audio Coding (AAC), and the like.

Display elements 112 may be configured with lights, LEDs, Liquid Crystal Displays (LCDs), plasma displays, and the like. Display server 120 may include a processor and a memory and may be configured for receiving and storing media content to be presented on the corresponding electronic display 110 at some scheduled time. Display server 120 may include functions such as, for example, formatting the content for its electronic display 110, animating the content for its electronic display 110, controlling presentation of content on the display element 112, controlling presentation of audio content on an audio element (not shown), controlling timing of various content on the display element 112, controlling timing of various content on the audio element, and communicating with the remote network 130.

Furthermore, display server 120 may perform diagnostic operations on the corresponding electronic display 110. For example, display server 120 may be configured to perform a diagnostic test on each LED within display element 112 in order to determine the condition of each LED. In one embodiment, display server 120 may determine the optical power output of each LED by sensing brightness and temperature levels from light and temperature sensors located adjacent each LED within display element 112. In another embodiment, photodetector chips may be placed in close proximity to each LED in display element 112 to measure light output of each LED during image display. Furthermore, display server 120 may be configured to determine an ambient light level of display element 112 and calibrate a brightness setting of display element 112 accordingly. Additionally, display server 120 may be configured to run diagnostic tests on one or more power supplies within a corresponding electronic display 110 to determine whether the power supplies are functioning properly. Display server 120 may also be configured to perform diagnostic tests to determine whether circuitry within electronic display 110 is functioning properly. In addition, display server 120 may be configured to determine a version of a software program currently running on display server 120. As described in greater detail below, results, faults, or errors generated by the diagnostic operations performed by display server 120 may be transmitted to, stored and displayed within remote network 130.

Camera element 122 may include one or more cameras configured and positioned to provide a still image and/or a real-time video of display element 112. Furthermore, camera element 122 may include one or more cameras configured and positioned to provide a still image and/or a real-time video of an area near display element 112 such as, for example, an area with automobiles or pedestrians that are approaching display element 112 (i.e., oncoming traffic). As described in more detail below, images or videos taken by camera element 122 may be transmitted to, stored and displayed within remote network 130.

Remote network 130 may be configured to control one or more electronic displays 110 and communicate with each electronic display 110 across a display communication link 115. The display communication link 115 may be any suitable communication link, such as, for example, any suitable direct-wired communication bus, satellite link, direct telephone line, wireless telephone link, or other wireless data links. The display communication link 115 may be intermittent or continuous. As a continuous communication example, with sufficient bandwidth a continuous communication link may be established to distribute media content as substantially real-time video directly to the electronic display 110. As an intermittent communication example, a communication link may be established between the electronic display 110 and the remote network 130 for short bursts of time to communicate information such as display status, media content, scheduling information, new software/firmware for the display server 120, and the like. Furthermore, the communication link may be initiated from either the electronic display 110 or the remote network 130.

Figure 2:
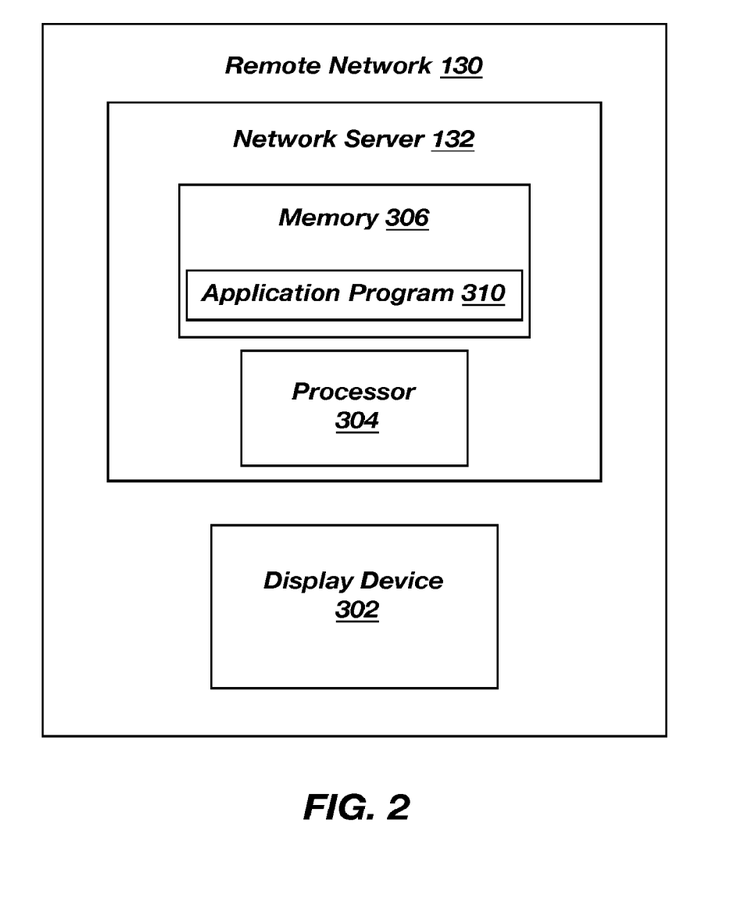
FIG. 2 is a block diagram of a remote network in accordance with an embodiment of the invention.

FIG. 2 illustrates a block diagram of remote network 130 including a network server 132 and display device 302. Network server 132 may include a processor 304 and a memory 306 having an application program 310 stored therein. The memory 306 may include: volatile memory such as dynamic random access memory (DRAM), or static random access memory (SRAM); non-volatile memory, such as Flash memory; and long-term storage in the form of magnetic media, such as hard disk drives, and optical media, such as compact disc read-only memory (CD-ROM), and digital versatile disc read-only memory (DVD-ROM). Application program 310 may operate under control of an operating system (not shown) stored in memory 306, and interfaced with a user to accept inputs and commands and to present outputs through a graphical user interface (GUI) 400 (see FIG. 3). For brevity and ease of description, GUI 400 will hereinafter be referred to as display viewer 400. Furthermore, display viewer 400 may be displayed within a display device 302. For example only, and not by limitation, display device 302 may include a flat-screen television. Portions of application program 310 may be distributed such that some of application program 310 may be included within remote network 130 and some of the application program 310 may be included within electronic display 110 (see FIG. 1).

Application program 310 may be configured to cause the network server 132 to connect to one or more electronic displays 110 (see FIG. 1) via the remote network 130 and communication link 115 (see FIG. 1). Upon successful connection to an electronic display 110, application program 310 may be configured to retrieve a real-time video and/or at least one image from a camera within camera element 122. Images retrieved from camera element 122 may be stored within memory 306 by application program 310 and archived in a slide-show video format for subsequent viewing. Viewing images in a slide-show format may allow a system operator to detect gradual changes in display element 112 (traffic). In addition, application program 310 may be configured to transmit images to a remote website to allow a customer to view images of their display by accessing the remote website. Application program 310 may also be configured to retrieve any diagnostic information generated from display server 120 within the electronic display 110. As described above, diagnostic information may include, but is not limited to, diagnostic results, faults, or errors generated by display server 120.

In addition to retrieving diagnostic information, application program 310 may be configured to retrieve additional data from electronic display 110. For example, application program 310 may retrieve a temperature value of one or more central processing units (CPUs) and/or one or more motherboards located within electronic display 110. A fan speed of one or more fans located within electronic display 110 may also be retrieved by application program 310. For example only, and not by way of limitation, application program 310 may be configured to cause the network server 132 to connect to and request images, videos, data and/or diagnostic information from each electronic display 110 every five seconds.

In addition to retrieving diagnostic information from operations performed by each electronic display 110, application program 310 may also perform diagnostic operations on electronic displays 110. For example, application program 310 may be configured to determine whether a network connection is established with an electronic display 110. To determine whether a network connection exists, application program 310 may send a query, such as a "ping," to a specific electronic display 110 and, thereafter, application program 310 may wait for a response from the electronic display 110. In the event that application program 310 receives a response from the electronic display 110, a network connection exists. If no response is received from electronic display 110, an operating network connection may not exist. Furthermore, application program 310 may be configured to determine whether each camera within camera element 122 is powered-on and in communication with application program 310. Additionally, application program 310 may be configured to determine whether display server 120 is powered-on and operating properly.

Figure 3:
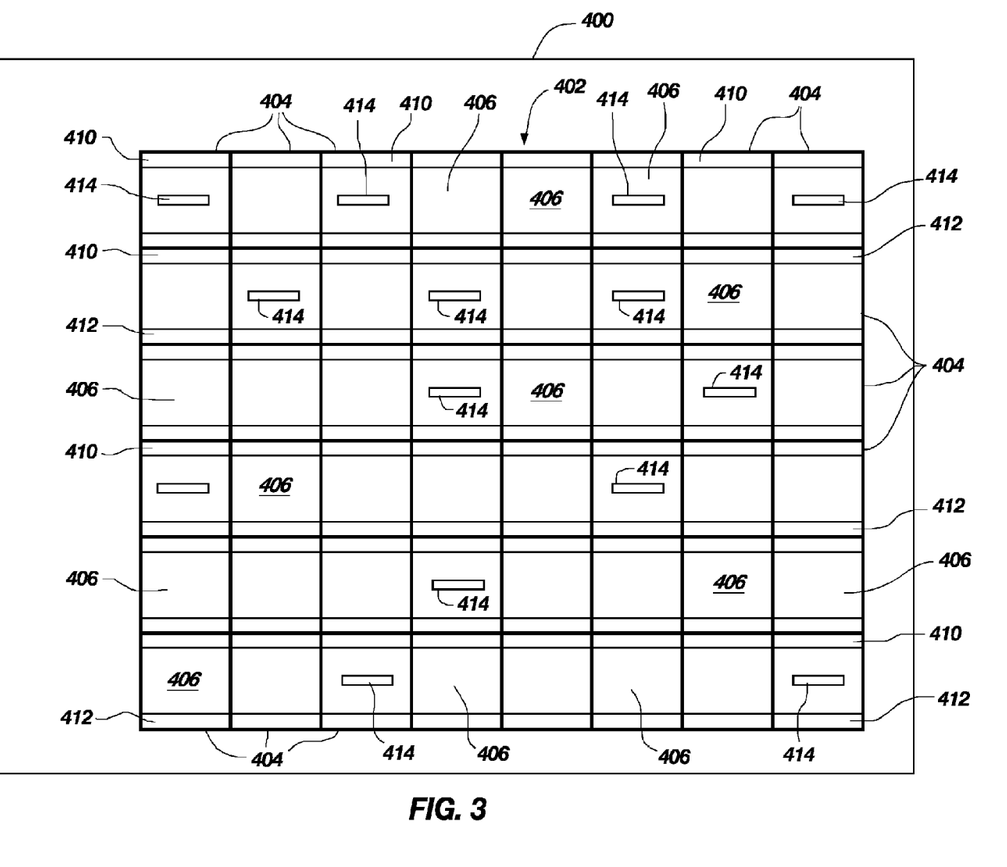
FIG. 3 is a block diagram of an image viewer including graphical information according to an embodiment of the invention.

Application program 310 may be configured to display images, videos, data, and/or any other diagnostic information pertinent to electronic displays 110. FIG. 3 illustrates display viewer 400 comprising graphical information. For example only, and not by way of limitation, the graphical information may be in the form of a thumbnail explosion 402 of thumbnails 404, which may include images 406 taken by camera element 122 (see FIG. 1) of an electronic display 110. Furthermore, thumbnails 404 may include data and/or diagnostic information relating to the corresponding electronic display 110. For example only, and not by limitation, a name of the electronic device 110 from which image 406 was taken may be displayed in a thumbnail, such as in region 410. Furthermore, a brightness value of display element 112, the time at the location of the electronic display 110 that image 406 was taken, and the current time at the location of network server 132 may be displayed in a thumbnail, such as in region 412. A status of display server 120 may also be displayed in a thumbnail, such as in region 412. For example, a "server down" message may be displayed within region 412. Thumbnails 404 may also include additional data or diagnostic information across a portion 414 of image 406, such as, for example, a status of a camera within camera element 122. For example only, a "camera down" or a "camera skipped" message may be displayed within portion 414. Thumbnails 404 including images 406, data, or diagnostic information relating to an electronic display 110 may quickly alert a system user, such as a maintenance technician within remote network 130, of any current or potential problems with electronic display 110.

Figure 4A:
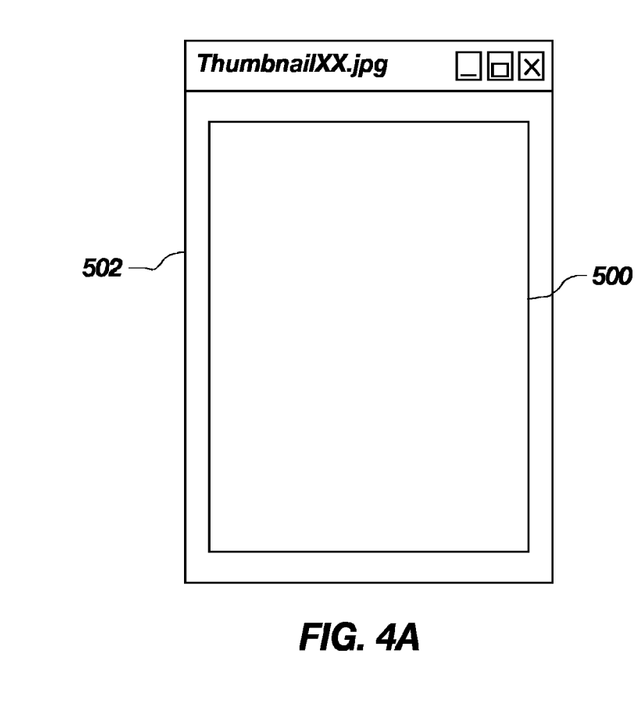
FIGS. 4A and 4B are illustrations of an enlarged thumbnail image and a video in accordance with an embodiment of the invention.

According to one embodiment of the invention, a system user may select a thumbnail 404 to generate a blown-up or enlarged version 500, as shown in FIG. 4A, of the selected thumbnail 404 displayed in a window 502. For example, if a system user determines a particular thumbnail 404 within thumbnail explosion 402 to be of particular interest, or if the user simply wishes to view an enlarged version 500 of any thumbnail 404, the user may select and enlarge a thumbnail 404 for further inquiry. Enlarged version 500 may also include more detailed information relating to diagnostic tests performed on electronic display 110.

Figure 4B:
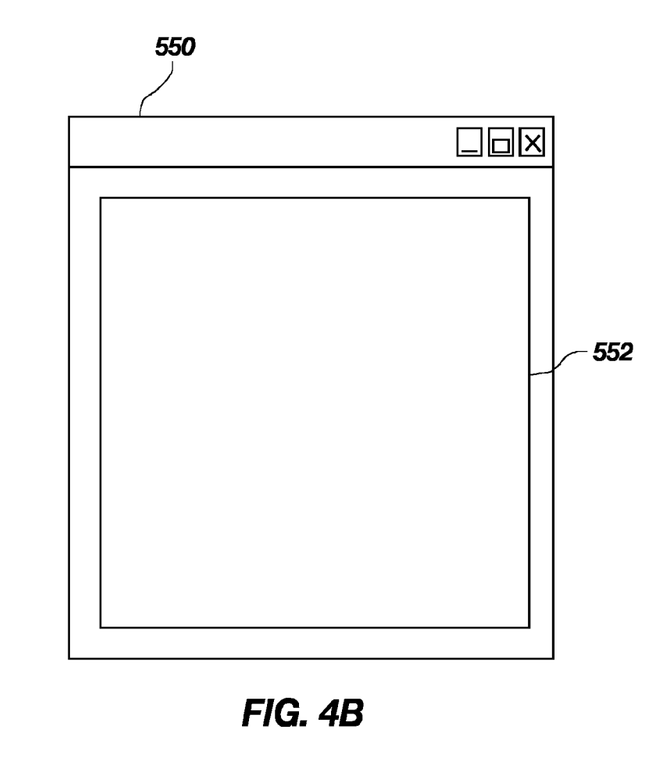

Furthermore, a system user may choose a "live mode" option to receive real-time video and receive real-time diagnostic information from electronic display 110. For example, if a system operator wishes to view a real-time video or receive real-time diagnostic information from a specific electronic display 110, the system user may select a representative thumbnail and a video player 550, as shown in FIG. 4B, configured to play a real-time video and display real-time information may be loaded. Thereafter, a corresponding live video 552 and/or real-time information may be provided. Real-time video and real-time diagnostic information may be helpful for various reasons. First, real-time diagnostic information relating to an electronic display 110 may quickly alert maintenance personnel within remote network 130 of any current or potential future problems with electronic display 110. Second, a technician or system user located within network 130 may, in real time, view and assist in repairs being made at electronic display 110 by another individual, such as a subcontractor. Third, a real-time video may serve as a method of proving that an individual, such as a subcontractor, performed the work reported at the location of electronic display 110.

Returning to FIG. 3, thumbnails 404 within thumbnail explosion 402 may be sorted according to various parameters, such as geographical region, customer, market, or electronic display 110. Therefore, thumbnail explosion 402 may include thumbnails 404 relating to a single electronic display 110, thumbnails 404 relating to one or more electronic displays 110, which all belong to a single customer, or thumbnails 404 relating to one or more electronic displays 110 within a geographic location or market.

Display viewer 400 may also include various features to allow a system user to set operating preferences of application program 310 (see FIG. 2) or the output configuration of display viewer 400. For example, a system user may choose how thumbnails 404 are sorted within display viewer 400 or the size of thumbnails 404 displayed within display viewer 400. As another example, a system user may choose to generate a text file comprising diagnostic reports of all electronic displays 110 within a display network 100 (see FIG. 1). Furthermore, a system user may choose how many attempts application program 310 may carry out to establish a connection with an electronic display 110.

A contemplated operation of display network 100 will now be described with reference to FIGS. 1-4B. At any time during operation, display server 120 may continuously perform various diagnostic operations on the corresponding electronic display 110. As described above, diagnostic operations may include determining the conditions of each LED within display element 112, calibrating a brightness setting of display element 112, determining a current version of a software program running on display server 120, and performing pass/fail tests for circuitry within electronic display 110. Furthermore, at any time during operation, application program 310 may attempt to connect to one or more electronic displays 110. Upon connection, application program 310 may request information, including images, video, data, or diagnostic information, from electronic displays 110. Furthermore, at any time during operation, application program 310 may perform diagnostic operations on one or more electronic displays 110. Diagnostic operations performed by application program 310 may include determining whether a network connection exists with an electronic display 110, determining whether each camera within camera element 122 is powered-on and in communication with application program 310, and determining whether display server 120 is powered-on and operating properly.

Upon retrieving information, such as an image, a video, data, and/or any diagnostic information from electronic display 110, network server 132 may store the data within remote network 130. Furthermore, application program 310 may display a thumbnail explosion 402 including at least one thumbnail 404 that may include an image and any pertinent data or diagnostic information corresponding to the electronic display 110.

A system operator within network 130 may select a thumbnail 404 in order to receive a larger version 500 of the selected thumbnail and more detailed diagnostic information, if available. Furthermore, a system operator may initiate a "live mode" video corresponding to a thumbnail 404 of interest. In "live mode," a system operator may select a thumbnail 404 and view a live video 552 and receive real-time diagnostic information corresponding to the electronic display 110 depicted in the selected thumbnail.

Turning to the software for the display network 100, those of ordinary skill in the art will recognize that the software processes illustrated herein are intended to illustrate representative processes that may be performed by embodiments of the present invention. Unless specified otherwise, the order in which the processes are described is not intended to be construed as a limitation. Furthermore, the processes may be implemented in any suitable hardware, software, firmware, or combinations thereof. By way of example, software processes may be configured for execution as the application program 310, on the network server 132, the display server 120 associated with each electronic display 110, or combinations thereof. When executed as firmware or software, the instructions for performing the methods and processes described herein may be stored on a computer-readable medium. A computer-readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

Specific embodiments have been shown by way of example in the drawings and have been described in detail herein; however, the various embodiments may be susceptible to various modifications and alternative forms. It should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. An apparatus for monitoring a first electronic display and a second electronic display of a plurality of electronic displays, the apparatus comprising:

a display device; and a network server operably coupled with the display device, and configured to communicate with the plurality of electronic displays, the network server comprising a memory having an application program stored therein, wherein the application program is configured to:

control the display device to display a first user interface on the display device that shows a first thumbnail corresponding to the first electronic display and a second thumbnail corresponding the second electronic display;

control the network server to transmit, in response to a user making a first selection of the first thumbnail, a first command for performing at least one diagnostic operation on at least one electrical circuit within the first electronic display to the first electronic display;

control the network server to transmit, in response to the user making a second selection of the second thumbnail, a second command for performing the at least one diagnostic operation on at least one electronic circuit within the second electronic display to the second electronic display;

control the network server to receive, from the first electronic display, first image data and first real-time diagnostic information corresponding to the at least one diagnostic operation performed on at least one electrical circuit of the first electronic display; and from the second electronic display, second image data and second real-time diagnostic information corresponding to the at least one diagnostic operation performed on at least one electrical circuit of the second electronic display;

control the display device to display, in response to the first selection, a second graphical user interface that shows the first image data and the retrieved first real-time diagnostic information; and control the display device to display, in response to the second selection, a third graphical user interface that shows the second image data and the retrieved second real-time diagnostic information.

2. The apparatus of claim 1, wherein the network server is connected to a display network including the plurality of electronic displays.

3. The apparatus of claim 2, wherein the first electronic display comprises a display element configured to present visual content.

4. The apparatus of claim 3, wherein the first electronic display is one among a billboard, a display on a vehicle, and a display on a building structure.

5. The apparatus of claim 3, wherein the visual content comprises content from a plurality of different advertisers.

6. The apparatus of claim 1, wherein the at least one diagnostic operation comprises performing at least one diagnostic operation on each LED of a corresponding electronic display of the plurality of electronic displays.

7. The apparatus of claim 6, wherein the first image data comprises a plurality of images from an internal view camera of the first electronic display and an external view camera of the first electronic display, the plurality of images being stored in a slide-show video format in the memory of the network server.

8. The apparatus of claim 7, wherein the application program is further configured to:
sort the first thumbnail and the second thumbnail according to at least one of a geographic location, a market and a customer,
set operating preferences of the application program; and
generate a text file comprising diagnostic reports of the plurality of electronic displays, and
wherein the first thumbnail comprises a plurality of regions for displaying different diagnostic result information.

9. The apparatus of claim 8, wherein the at least one diagnostic operation further comprises calibrating a brightness setting.

10. The apparatus of claim 8, wherein the at least one diagnostic operation further comprises determining whether an internal view camera element of the corresponding electronic display is powered on, determining whether an external view camera element of the corresponding electronic display is powered on, wherein the at least one diagnostic operation further comprises performing at least one diagnostic operation on each LED of the corresponding electronic display, calibrating a brightness setting, performing pass/fail tests for the at least one electrical circuit of the corresponding electronic display, sensing brightness levels from light sensors located adjacent each LED of the corresponding electronic display, sensing temperature levels from temperature sensors located adjacent each LED of the corresponding electronic display, and determining a fan speed of a fan in the corresponding electronic display.

11. The apparatus of claim 1, wherein the application program is further configured to enlarge the first thumbnail in response to the first selection.

12. The apparatus of claim 1, wherein the at least one diagnostic operation further comprises performing at least one diagnostic operation on each LED of a corresponding electronic display, calibrating a brightness setting, determining whether a camera element of the corresponding electronic display is powered on, performing pass/fail tests for the at least one electrical circuit of the corresponding electronic display, sensing brightness levels from light sensors located adjacent each LED of the corresponding electronic display, sensing temperature levels from temperature sensors located adjacent each LED of the corresponding electronic display, and determining a fan speed of a fan in the corresponding electronic display.

13. An apparatus for monitoring a plurality of electronic displays comprising a first electronic display and a second electronic display, the apparatus comprising:
a display device configured to display a first user interface that shows a first thumbnail corresponding to the first electronic display and a second thumbnail corresponding the second electronic display, and receive a user selection of one among a first selection of the first thumbnail and a second selection of the second thumbnail; and
a network server operably coupled with the display device, and configured to communicate with the plurality of electronic displays, the network server comprising a non-transitory computer-readable storage media storing instructions that when executed by a processor cause the apparatus to:
transmit, in response to the first selection, a first command for performing at least one diagnostic operation on at least one electrical circuit within the first electronic display to the first electronic display;
transmit, in response to the second selection, a second command for performing the at least one diagnostic operation on at least one electronic circuit within the second electronic display;
receive first image data and first real-time data relating to the at least one diagnostic operation from the first electronic display;
receive second image data and second real-time data relating to the at least one diagnostic operation from the second electronic display;
control the display device to display, in response to the first selection, a second graphical user interface that shows the first image data and a first diagnostic result corresponding to the received first real-time data; and
control the display device to display, in response to the second selection, a third graphical user interface that shows the second image data and a second diagnostic result corresponding to the received second real-time data.

14. The apparatus of claim 13, wherein the first image data comprises a first image of the first electronic display and the second image data comprises a second image of the second electronic display.

15. The apparatus of claim 14, wherein the non-transitory computer-readable storage media further comprises instructions that when executed by the processor cause the display device to enlarge the first thumbnail in response to the first selection.

16. A non-transitory computer-readable medium storing a program comprising instructions for implementing a method of displaying a graphical user interface for display on a display device, the method comprising:
  displaying a first user interface that shows a first thumbnail corresponding to a first electronic display of an electronic display network and a second thumbnail corresponding a second electronic display of the electronic display network;
  receiving a user input of one among a first selection of the first thumbnail and a second selection of the second thumbnail;
  transmitting, in response to the first selection, a first command for performing at least one diagnostic operation on at least one electrical circuit within the first electronic display;
  transmitting, in response to the second selection, a second command for performing at least one diagnostic operation on at least one electrical circuit within the second electronic display;
  receiving first image data and first real-time diagnostic information from the first electronic display and second image data and second real-time diagnostic information from the second electronic display;
  displaying, in response to the first selection, a second graphical user interface that shows the first image data and a first diagnostic result corresponding to the received first real-time diagnostic information; and
  displaying, in response to the second selection, a third graphic user interface that shows the second image data and a second diagnostic result corresponding to the received second real-time diagnostic information.

17. The non-transitory computer-readable medium of claim 16, wherein the first image data comprises a first image of a first display element of the first electronic display and the second image data comprises a second image of a second display element of the second electronic display.

18. The non-transitory computer-readable medium of claim 16, wherein the first image data is first real-time image data corresponding to the first electronic display and the second image data is second real-time image data corresponding to the second electronic display.

19. The non-transitory computer-readable medium of claim 16, wherein the first thumbnail comprises a plurality of regions for displaying different diagnostic result information.

20. The non-transitory computer-readable medium of claim 19, wherein the method further comprises displaying a first name of the first electronic display in a first region of the plurality of regions.

21. The non-transitory computer-readable medium of claim 20, wherein the first real-time diagnostic data corresponds to one among a brightness value of the first electronic display, a status of the first electronic display, and a status of a peripheral device connected to the first electronic display in a second region of the plurality of regions.

22. The non-transitory computer-readable medium of claim 16, wherein the method further comprises generating an enlarged version of the first thumbnail on the display device in response to the first selection.

23. The non-transitory computer-readable medium of claim 22, wherein the method further comprises generating additional information regarding the first electronic display not available in the first thumbnail prior to the selection by the user.

24. The non-transitory computer-readable medium of claim 16, wherein the method further comprises generating a real-time display window on the display device corresponding to the first electronic display in response to the first selection.

25. The non-transitory computer-readable medium of claim 24, wherein the first image data comprises live video from a camera of the first electronic display.

* * * * *